Patented June 30, 1953

2,644,002

UNITED STATES PATENT OFFICE 2,644,002

THIOPHOSPHATOSUCCINIMIDES

Erick I. Hoegberg, Greenwich, Conn., assignor to American Cyanamid Company, New York, N. Y., a corporation of Maine No Drawing. Application August 29, 1951, Serial No. 244,277

6 Claims. (Cl. 260—326.5)

The present invention relates to new and useful organic phosphate compounds.

These new compounds are thiophosphatosuccinimides which conform to the general formula

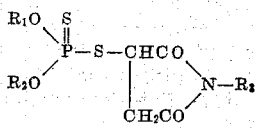

in which $R_1$, $R_2$, and $R_3$, are chosen from the group consisting of alkyl, aralkyl, aryl, and alkaryl radicals.

In the new compounds the $R_s$ may be the same or different radicals, and when they stand for alkyl radicals it is to be understood that they represent both the straight chain and branched chain, the saturated and unsaturated, and the cycloaliphatic hydrocarbon radicals. Typical examples of these radicals are methyl, ethyl, n-propyl, isopropyl, n-butyl, isobutyl, sec.-amyl, n-hexyl, 2-ethylhexyl, n-octyl, n-decyl, n-dodecyl, n-octadecyl, oleyl, cetyl, ceryl, allyl, cyclohexyl, benzyl, phenyl, p-chlorophenyl, tolyl, xylyl, naphthyl and naphthylmethyl.

The thiophosphatosuccinimides of this invention may be readily prepared by reacting an acid phosphate of the formula

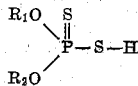

in which $R_1$ and $R_2$ have the meaning shown above, with an N-substituted maleimide of the formula

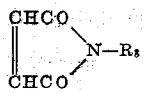

in which $R_3$ has the meaning shown above.

A typical reaction in which O,O-dimethyl dithiophosphoric acid is reacted with N-ethylmaleimide to produce α-(O,O-dimethyl dithiophosphato)-N-ethylsuccinimide may be illustrated as follows:

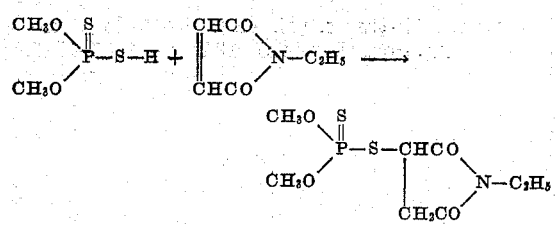

The reaction is somewhat exothermic and may be readily controlled by carrying it out in the presence of an inert solvent. It is also advantageous to employ a solvent when one or both of the reactants are solids. Such solvents include saturated aliphatic esters such as ethyl acetate, amyl acetate, 2-ethylhexyl acetate, methyl propionate, methyl butyrate, ethyl butyrate, and isopropyl butyrate; saturated aliphatic nitriles such as acetonitrile and propionitrile, dioxane, benzene, nitrobenzene, chlorbenzene, toluene, xylene, chloroform, and carbon tetrachloride.

The reaction is preferably carried out at a temperature within the range of from about 20° to 150° C. However, temperatures outside of this range may be employed depending upon the type of reactants and solvents utilized.

The following examples will further illustrate the invention.

Example 1

12.9 g. of N-ethylmaleimide were added gradually to 7.6 g. of O,O-dimethyl dithiophosphoric acid (92° purity). Heat was evolved and the temperature of the mixture rose to about 75° C. After the reaction had subsided, the mixture was allowed to stand at room temperature for about 16 hours, then dissolved in 50 cc. of benzene, washed twice with 10% sodium bicarbonate solution and once with water. The benzene solution was stripped of solvent by distillation at reduced pressure, first at 20–30 mm., and finally at 0.5 mm. pressure. The residual solid was recrystallized from 25 cc. of ethyl alcohol, giving 10.3 g. (72% yield) of α-(O,O-dimethyl dithiophosphato)-N-ethylsuccinimide, a colorless crystalline product melting at 59–60° C.

Example 2

The procedure of Example 1 was employed using 15.7 g. of N-(2-ethylhexyl) maleimide and 15.5 g. of O,O-diethyl dithiophosphoric acid (90% purity). The residual product, α-(O,O-diethyl dithiophosphato)-N-(2-ethylhexyl)-succinimide, weighing 25.3 g. (85% yield) was a viscous, straw-colored liquid having a refractive index $n_D^{25}$ 1.5083.

Example 3

A mixture consisting of 18.8 g. of O,O-diethyl dithiophosphoric acid (95.8% purity) and 34.9 g. of N-(n-octadecyl) maleimide was heated at 65° C. for 4 hours, and then allowed to stand overnight at room temperature. The reaction mixture was dissolved in 100 cc. of benzene, washed twice with 10% sodium bicarbonate solution and dried over anhydrous calcium sulfate. The benzene solution was stripped of solvent by distillation at reduced pressure. The residual product, α-(0,0-diethyl dithiophosphato)-N-(n-octadecyl)-succinimide, was a viscous dark brown liquid.

*Example 4*

A mixture consisting of 10 g. of 0,0-diethyl dithiophosphoric acid (95% purity) and 10.4 g. of N-(4-chlorophenyl)maleimide was heated for five hours at 65° C., and then allowed to stand for 16 hours at room temperature. The solid reaction product was recrystallized from 100 cc. of methyl alcohol, giving 15.5 g. (79% yield) of N - (4 - chlorophenyl) -α-(0,0-diethyl dithiophosphato)-succinimide, a colorless crystalline material melting at 90.5–92° C.

*Example 5*

The procedure of Example 4 was employed using 9.8 g. of 0,0-diethyl dithiophosphoric acid (95% purity) and 10.9 g. of N-(4-nitrophenyl)-maleimide. 16.1 g. (80% yield) of α-(0,0-diethyl dithiophosphato) - N - (4-nitrophenyl)-succinimide were obtained. The product was a colorless crystalline material melting at 118.5–119.5° C.

*Example 6*

A mixture consisting of 2.5 g. of 0,0-diethyl dithiophosphoric acid (90% purity) and 2.9 g. of N-(p-sulfamylphenyl)maleimide was allowed to stand at room temperature for 5 days. The solid reaction product was recrystallized from acetone, giving 2.3 g. of α-(0,0-diethyl dithiophosphato)-N-(p-sulfamylphenyl)-succinimide, a colorless crystalline material melting at 199–200° C. with decomposition.

*Example 7*

5.3 g. of N-allylmaleimide were added gradually to 7.5 g. of 0,0-diethyl dithiophosphoric acid (95.8% purity). Heat was evolved and the temperature of the mixture rose to about 46° C. After the reaction had subsided, the mixture was allowed to stand at room temperature for four days, then dissolved in 30 cc. of benzene, washed with 10% sodium bicarbonate solution and with water. The benzene solution was stripped of solvent by distillation under reduced pressure. The residual product, α-(0,0-diethyl dithiophosphato)-N-allylsuccinimide, weighing 7.4 g. was a clear, yellow liquid having a refractive index $n_D^{25}$ 1.5312.

*Example 8*

The procedure of Example 3 was employed using 9.2 g. of 0,0-bis(2-ethylhexyl) dithiophosphoric acid (94.5% purity) and 3.8 g. of N-isobutylmaleimide. The residual product, α-[0,0-bis(2 - ethylhexyl) dithiophosphato]-N-isobutylsuccinimide, weighing 11.5 g. (93% yield) was an amber-colored liquid having a refractive index $n_D^{25}$ 1.4958.

*Example 9*

A mixture consisting of 40 g. of 0,0-di-n-tetradecyl dithiophosphoric acid (87.1% purity) and 11.5 g. of N-phenylmaleimide was heated on a steam bath for 5 hours, and then allowed to stand overnight at room temperature. The reaction mixture was dissolved in 100 cc. of benzene, washed twice with 10% sodium bicarbonate solution and dried over anhydrous sodium sulfate. The benzene solution was stripped of solvent by distillation at reduced pressure. The residual product α-(0,0-di-n-tetradecyl dithiophosphato)-N-phenylsuccinimide, was a dark brown liquid having a refractive index $n_D^{25}$ 1.5055.

*Example 10*

A mixture consisting of 28.2 g. of 0,0-diphenyl dithiophosphoric acid, 17.3 g. of N-phenylmaleimide and 50 cc. of benzene was heated on a steam bath at reflux for one hour, and then allowed to stand at room temperature for 16 hours. The reaction mixture was diluted with 100 cc. of benzene, washed with 10% sodium bicarbonate solution and dried over anhydrous magnesium sulfate. The benzene solution was stripped of solvent by distillation at reduced pressure. The residual product, α-(0,0-diphenyl dithiophosphato) - N-phenylsuccinimide, weighing 41 g. (90% yield) was a viscous, brown liquid having a refractive index $n_D^{25}$ 1.6140.

The thiophosphatosuccinimides of the present invention are adapted for various uses, more particularly as insecticides, fungicides, plasticizers, corrosion inhibitors, flotation agents, and petroleum additives.

While the invention has been described with particular reference to specific embodiments, it is to be understood that it is not to be limited thereto but is to be construed broadly and restricted solely by the scope of the appended claims.

I claim:

1. Thiophosphatosuccinimides of the general formula

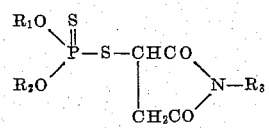

in which R₁, R₂, and R₃, are chosen from the group consisting of alkyl, aralkyl, aryl, and alkaryl radicals.

2. α-(0,0-dimethyl dithiophosphato)-N-ethylsuccinimide.

3. α - (0,0-diethyl dithiophosphato)-N-(2-ethylhexyl)-succinimide.

4. α - [0,0-bis(2-ethylhexyl) dithiophosphato]-N-isobutylsuccinimide.

5. α-(0,0-di-n-tetradecyl dithiophosphato)-N-phenylsuccinimide.

6. α - (0,0-diphenyl dithiophosphato)-N-phenylsuccinimide.

ERICK I. HOEGBERG.

References Cited in the file of this patent

UNITED STATES PATENTS

| Number | Name | Date |
|---|---|---|
| 2,578,652 | Cassaday | Dec. 18, 1951 |

OTHER REFERENCES

Chemical Abstracts, vol. 44, p. 550 citing Marion, J. Chem. Soc. (London), 1949, pp. 1515–1516.